United States Patent [19]

Zbornik

[11] Patent Number: 4,653,307

[45] Date of Patent: Mar. 31, 1987

[54] BENDING TOOL

[76] Inventor: Vaclav Zbornik, Titlisstrasse 4, 4665 Oftringen, Switzerland

[21] Appl. No.: 641,583

[22] Filed: Aug. 17, 1984

Related U.S. Application Data

[63] Continuation-in-part of Ser. No. 219,231, Dec. 22, 1980, abandoned.

[30] Foreign Application Priority Data

Dec. 22, 1979 [DE] Fed. Rep. of Germany ....... 2952108

[51] Int. Cl.⁴ ............................................. B21D 11/22
[52] U.S. Cl. ....................................... 72/389; 72/448; 403/358
[58] Field of Search ................. 72/389, 386, 380, 440, 72/448, 39, 465; 403/409, 358, 374

[56] References Cited

U.S. PATENT DOCUMENTS

| | | | |
|---|---|---|---|
| 3,584,497 | 6/1971 | Pohjolo | 72/448 |
| 3,844,156 | 10/1974 | Honni et al. | 72/448 |
| 4,106,323 | 8/1978 | Haenni et al. | 72/448 |
| 4,131,008 | 12/1978 | Malatto | 72/389 |
| 4,354,374 | 10/1982 | Deguchi | 72/389 |

Primary Examiner—R. L. Sprvill
Assistant Examiner—David B. Jones
Attorney, Agent, or Firm—Karl F. Ross; Herbert Dubno

[57] ABSTRACT

A bending tool for a bending press comprising an upper die member detachably secured to a vertically reciprocable ram for bending a flat metal workpiece to a predetermined depth in a lower female bending die. The bottom surface of the female bending die cavity is formed by a plurality of flat headed pins in side by side slots or bores. The heads of the pins form the bottom flat surface of a longitudinal groove which forms the bottom die cavity surface. The vertical adjustment of the pins is provided by the interfitting combination of a left side wedge assembly, a middle wedge assembly and a right side wedge assembly. The interfitting prevents displacement of any one of the supporting assemblies for the pins to assure improved bending precision.

1 Claim, 5 Drawing Figures

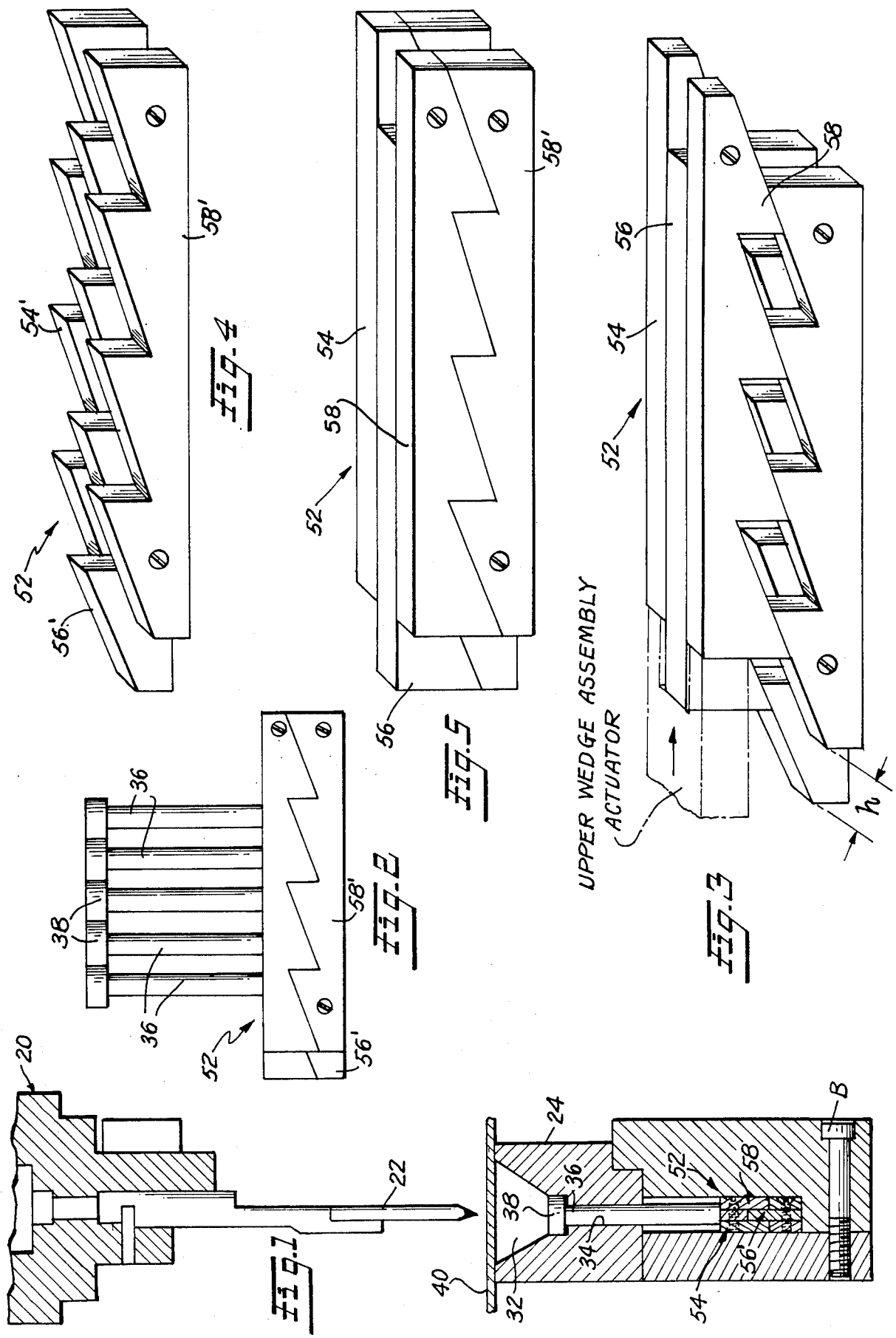

BENDING TOOL

CROSS REFERENCE TO RELATED APPLICATIONS

This application is a continuation-in-part of my prior pending application Ser. No. 219,231 filed Dec. 22, 1980, now abandoned.

BACKGROUND OF THE INVENTION

1. Field of the Invention

The present invention relates to a bending tool for bending sheet metal and particularly to a bending die cooperating with a bending bar connected to the ram of a press brake. The bending bar has a tapered edge cooperating with a longitudinal groove on the top of the bending die, and the bending angle may be adjusted by varying the depth of the longitudinal groove.

2. The Prior Art

In the U.S. Pat. No. 3,844,156, there is provided a bending tool for bending sheet metal which comprises a lower female bending die operating in conjunction with an upper male bending die, the bending bar. The side of the lower bending die that faces the upper die comprises a longitudinal groove, the cross section of which can in principle be configured according to individual requirements. In the so-called "free bending", the sheet of metal to be bent lies with one side against two straight edges on the bottom die and along one straight edge on the top die. The acuteness of the angle formed in the sheet is dependent on the distance by which the upper die penetrates into the groove provided in the lower die. It has been further proposed that the bottom of the groove in the lower die be provided with an arrester strip by means of which the penetration distance from the said bottom to the surface of the die can be adjusted. Thereby the bending angle of the sheet metal to be processed can be varied. It was feasible to furnish the bottom surface of the longitudinal groove over its entire length with a number of adjacently arranged inclined surfaces. Consequently, the lower surface of the arrester rail exhibits a corresponding number of oblique surfaces cooperating with the oblique surfaces of the bottom of the longitudinal groove. In this manner a saw-toothed wedge system was formed by means of which the height of the lower die groove base was changed by moving the lower wedge relative to the upper wedge. The groove base was formed either by the arrester rail or by vertically moveable pins. This arrangement has proved to be very successful.

However, in connection with precision work, the disadvantage arises that in the vicinity of the gaps that are formed when the two wedges are moved in opposite directions, undesirable deflections occur as a result of the heavy loading which is exerted by the bending ram of the press.

OBJECT OF THE INVENTION

It is the object of the present invention to provide an improved apparatus for the adjustment of the height of the lower die base surface in which the above mentioned disadvantage is eliminated. In particular, it is an object of the invention to provide a lower die with a longitudinal groove on its upper surface, the depth of which can be varied easily without affecting the processing precision of a sheet metal to be bent.

SUMMARY OF THE INVENTION

The bending tool for the bending of sheet metal comprises an upper die member mounted on a vertically reciprocable ram and a lower or female die which is provided with a longitudinal groove on the bottom part of the die cavity. A plurality of bores, side by side, running along the die cavity on the side facing the upper die member accommodate a series of flat headed pins. These pins define the longitudinal groove and the heads of the pins define the adjustable base surface. The adjustment of the depth is effected by means of a combination of saw-toothed wedge assemblies comprising a right hand saw-toothed wedge assembly, a left hand wedge assembly and a middle assembly which is adjustable to maintain a uniform surface at the bottom of the longitudinal groove.

Thus the thus named wedge systems provide direct support for each of the number of vertically displaceable pins forming the bottom surface of the longitudinal groove. Also, each of the wedge systems are arranged side by side in such a manner that in each of the saw-toothed wedge systems the gaps formed by sliding an upper and a lower wedge in opposite directions are longitudinally staggered with respect to the gaps in the adjacent saw-toothed wedge system. For this purpose each of the saw-toothed wedge systems is displaced in staggered relationship with respect to the adjacent saw-toothed wedge system by at least a fraction of the saw-tooth pitch. The mating sliding surfaces of the wedges can be provided with transverse slots acting as oil grooves.

By the interfitting operation of these three wedge systems, right, left and middle, the deflection of the wedges is reliably prevented, so the bending tool can function with great precision and the sheet metal to be processed can be accurately bent into the desired angle.

BRIEF DESCRIPTION OF THE DRAWINGS

In the following, there will be described a preferred embodiment of the invention, with reference to the accompanying drawings, in which:

FIG. 1 shows in diagrammatic form, a vertical sectional view of a vertically reciprocable ram in operative relation to a metal workpiece, the female bending die and an underlying wedge assembly of the bending press which comprises an upper and lower left side wedge assembly and an upper and lower middle wedge assembly and an upper and lower right side wedge assembly;

FIG. 2 is a side view in elevation of the upper and lower wedge assembly, and the vertical pins having flat heads which are located at the bottom of the die cavity of the press;

FIG. 3 is an enlarged perspective view of the wedge assembly of FIG. 2 shown apart from the pins in which the wedge elements are displaced relative to each other in the direction of the arrow by the actuator shown in phantom lines;

FIG. 4 is a perspective view of the bottom wedge assembly; and

FIG. 5 is a perspective view of the wedge assembly of FIG. 3 in which the wedge elements are in a static condition.

DESCRIPTION OF THE PREFERRED EMBODIMENT

In accordance with the invention, an interfitting combination of wedge assemblies is used to adjust the base of the bending press, and reference is made to FIG. 1 which shows a bending apparatus in which an upper die member 22 has a tapered end and is mounted on a vertically reciprocable ram 20, and a lower die has a longitudinal groove 32 formed therein. The upper die member 22 is interchangeably secured to the vertically reciprocable ram 20 and is shown in operating relation to the body 24 formed with groove 32 of the lower or female die with the flat metal workpiece 40 which is to be bent overlying the die cavity 32. The bottom part of the lower die cavity 32 is formed as a longitudinal groove with a plurality of longitudinally disposed bores 34 in which pins 36 are vertically and adjustably arranged. Each pin 36 has a flat head 38. The flat heads 38 of the pins form the bottom surface of the longitudinal groove 32. This array of pins is adjusted by the interfitting wedge systems of the invention.

The novel means for adjusting the depth of the groove comprises the wedge assemblies 52 shown in detail in FIGS. 2-5. The groove depth is regulated by adjusting the pins 36 in the vertical direction by means of a plurality of upper saw-toothed wedge means comprising the left wedge assembly 54, the middle wedge assembly 56 and the right wedge assembly 58. One can see from the lower part of FIG. 1 that the plurality 52 of these three saw-toothed wedge assemblies are arranged in an interfitting group with the lower wedge means which consists of the left hand wedge assembly 54' and the right wedge assembly 58' with the middle wedge assembly 56' between 54' and 58'. Each of these three wedges in FIG. 1 are arranged in side by side relation and in staggered relationship with respect to the adjacent assembly; the three upper assemblies together support all pins 36. Thus each wedge assembly comprises a lower wedge means and an upper wedge means which is slidably arranged in the length direction on the lower wedges as shown in FIG. 3.

Now, turning specifically to FIG. 2 which shows a side view of wedge assembly 52, it is noted that each of the upper and lower wedges is equal in shape to interfit and also note that the pins 36 are arranged on the upper wedges.

FIG. 3 shows the same wedge units of FIG. 2 but all of the upper wedges of the assembly which are secured together are moved relative to the lower wedges in a horizontal direction. The middle wedges 56 are displaced at a distance h relative to the left and right wedge assemblies 54 and 58 respectively.

Thus the saw-toothed wedge systems in the assembly consists of a lower wedge element and an upper wedge element. The representation in FIG. 3 indicates that when the upper wedge element is moved relative to the lower wedge element, a gap appears and leads to a deflection of the upper wedge element under the influence of the vertically acting forces from the ram 20. According to the arrangement of the three-wedge assemblies of the invention a plurality of saw-toothed wedge systems are thus arranged collectively in such a manner that the gaps of any two adjacent systems are staggered in the longitudinal direction in a reproducible manner to control the depth of penetration without affecting the desired bending precision. For this purpose the middle wedge assembly is displaced in the horizontal direction at the distance h relating to the left and right wedge assemblies.

To better understand this precision, attention is invited to FIG. 3 which shows the wedge assemblies 52. The middle wedge assembly 52 of said wedge assemblies is displaced in an axial direction by a distance of h relative to the left and right wedge assemblies 54 and 52 respectively. By sliding the upper wedges which are secured together relative to the lower wedges also secured together in the horizontal direction, the gaps between the wedges of said middle system are staggered in relation to the gaps in the adjacent left and right wedge units and in this manner the undesirable deflection of the wedges can be prevented.

The left side wedge system means and the right side wedge system means are secured to each other as shown in FIG. 1 by means of a bolt B which extends through the bottom portion below the pin and wedge pairs.

As shown in the Figs. all the upper wedges are bolted together and all the lower wedges are bolted together in a manner that all the upper wedges can be moved in common against the corresponding lower wedges.

Thus the lower wedges, which are bolted together, are stationary and fixed in the groove and the upper wedges are likewise bolted together and are slidably arranged on the lower wedges. The gaps of the adjacent saw shaped teeth are longitudinally displaced relative to each other and a deflection of the wedges is thereby prevented.

The present FIG. 3 mechanism is different from assignee's prior U.S. Pat. No. 4,016,323 which shows positioning screws 19 and 20 arranged for the movement of a wedge shaped member 17.

None of the embodiments of applicant's prior patent show the side-by-side three part wedge assemblies of the present invention.

I claim:

1. A bending press for bending sheet metal, said bending press comprising:
 a vertically movable ram forming an upper portion of said press;
 an upper male bending die mounted on said ram;
 a lower female bending die forming a lower portion of said press and cooperating with said upper male bending die and including:
  a body formed with an upwardly open groove below said upper male bending die and into which sheet metal resting on said body can be bent by said upper male bending die upon downward movement of said ram, and
  means defining an adjustable height floor of said groove controlling depth of penetration of said sheet metal into said groove and an angle of bend formed therein, said means defining said floor comprising a plurality of parallel vertical pins having shanks spaced apart along said groove and slidable in respective bores of said body, said pins forming a row and having substantially adjacent heads defining said floor; and
 a wedge assembly below said body and engaging lower free ends of said pins for raising and lowering said pins, said assembly comprising:
  a pair of outer lower wedges extending parallel to said row and having upwardly directed teeth in a sawtooth pattern with the teeth of the outer lower wedges being laterally aligned with one another,
  a middle lower wedge extending parallel to said row between said outer lower wedges and longitudinally displaced relatively thereto while having upwardly directed teeth in a sawtooth pattern longitudinally offset from the teeth of said outer lower wedges, means for bolting all of said lower wedges together, a pair of outer upper wedges extending parallel to said row having downwardly directed teeth in a sawtooth pattern with the teeth of the outer upper wedges being laterally aligned with one another and engaging the teeth of respective outer lower wedges, a middle upper wedge extending along said row between said outer upper wedges and longitudinally displaced relatively thereto while having downwardly directed teeth in a sawtooth pattern longitudinally offset from the teeth of said outer upper wedges, said pins riding upon said middle upper wedge and said outer upper wedges for vertical displacement thereby, means for longitudinally moving said upper wedges whereby the teeth thereof ride up on the teeth of said lower wedges and said upper wedges are vertically displaced, and means for bolting all of said upper wedges together.

* * * * *